United States Patent
Nakayama

(10) Patent No.: US 9,226,129 B2
(45) Date of Patent: Dec. 29, 2015

(54) COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

(75) Inventor: Satoshi Nakayama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 400 days.

(21) Appl. No.: 13/431,384

(22) Filed: Mar. 27, 2012

(65) Prior Publication Data

US 2013/0176938 A1 Jul. 11, 2013

(30) Foreign Application Priority Data

Jan. 6, 2012 (JP) ................. 2012-001423

(51) Int. Cl.
*H04W 4/00* (2009.01)
*H04W 8/00* (2009.01)
*H04W 48/10* (2009.01)
*H04W 88/06* (2009.01)

(52) U.S. Cl.
CPC .............. *H04W 8/005* (2013.01); *H04W 48/10* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,327,468 B1* | 12/2001 | van Iersel et al. ............ | 455/434 |
| 7,453,854 B2 | 11/2008 | Fujishima et al. | |
| 8,131,291 B2 | 3/2012 | Jeong et al. | |
| 8,223,662 B2* | 7/2012 | Deshpande et al. .......... | 370/252 |
| 8,270,454 B2* | 9/2012 | Sugaya ......................... | 375/131 |
| 8,345,590 B2* | 1/2013 | Amagai et al. ................ | 370/315 |
| 8,446,865 B2* | 5/2013 | Zhai et al. ..................... | 370/329 |
| 8,503,377 B2* | 8/2013 | Cordeiro et al. .............. | 370/329 |
| 2004/0131034 A1 | 7/2004 | Sugaya | |
| 2004/0223466 A1 | 11/2004 | Schrader et al. | |
| 2004/0235472 A1 | 11/2004 | Fujishima et al. | |
| 2005/0135318 A1 | 6/2005 | Walton et al. | |
| 2006/0013177 A1 | 1/2006 | Saito | |
| 2006/0050730 A1* | 3/2006 | Shvodian ..................... | 370/458 |
| 2006/0159041 A1 | 7/2006 | Zhun | |
| 2006/0225089 A1 | 10/2006 | Ikeda | |
| 2006/0268802 A1 | 11/2006 | Faccin | |
| 2006/0285527 A1 | 12/2006 | Gao et al. | |

(Continued)

FOREIGN PATENT DOCUMENTS

JP 2007-519293 7/2007
JP 2007-235781 9/2007

(Continued)

OTHER PUBLICATIONS

May 10, 2013 European Search Report for EP12161264.2. 5 pages.

(Continued)

*Primary Examiner* — Ian N Moore
*Assistant Examiner* — Phong La
(74) *Attorney, Agent, or Firm* — Nixon & Vanderhye PC

(57) ABSTRACT

An example communication system includes a plurality of communication apparatuses including a search communication apparatus which searches for another communication apparatus. The search communication apparatus includes a search request transmission section configured to transmit a search request signal by using a first channel. The search request signal includes information about a second channel different from the first channel.

8 Claims, 12 Drawing Sheets

(56) References Cited

U.S. PATENT DOCUMENTS

| | | | |
|---|---|---|---|
| 2007/0213012 A1 | 9/2007 | Marin et al. | |
| 2007/0230423 A1 | 10/2007 | Yoshida et al. | |
| 2008/0019287 A1* | 1/2008 | Hong | 370/254 |
| 2008/0031193 A1* | 2/2008 | Laroia et al. | 370/331 |
| 2008/0056133 A1* | 3/2008 | Deshpande et al. | 370/235 |
| 2008/0057936 A1 | 3/2008 | Oosawa | |
| 2009/0017797 A1 | 1/2009 | Li et al. | |
| 2009/0122768 A1 | 5/2009 | Nakashima et al. | |
| 2009/0190534 A1 | 7/2009 | Yamada et al. | |
| 2009/0310573 A1 | 12/2009 | Sim et al. | |
| 2010/0002659 A1 | 1/2010 | Doi et al. | |
| 2010/0111006 A1* | 5/2010 | Zhai et al. | 370/329 |
| 2010/0120364 A1 | 5/2010 | Lee et al. | |
| 2010/0222093 A1 | 9/2010 | Imamura et al. | |
| 2010/0232400 A1* | 9/2010 | Patil et al. | 370/337 |
| 2010/0232415 A1 | 9/2010 | Hayashino et al. | |
| 2010/0271959 A1 | 10/2010 | Qi et al. | |
| 2010/0296434 A1* | 11/2010 | Amagai et al. | 370/315 |
| 2011/0274098 A1* | 11/2011 | Jung et al. | 370/338 |
| 2012/0120892 A1 | 5/2012 | Freda et al. | |
| 2013/0070676 A1 | 3/2013 | Koop et al. | |
| 2013/0077558 A1 | 3/2013 | Ukita et al. | |
| 2013/0230038 A1 | 9/2013 | Walton et al. | |

FOREIGN PATENT DOCUMENTS

| | | |
|---|---|---|
| JP | 2010-187147 | 8/2012 |
| WO | 2007-066741 | 6/2007 |
| WO | 2008/088190 | 7/2008 |
| WO | 2010-142468 | 12/2010 |

OTHER PUBLICATIONS

European Search Report for Application No. 12161260.0, mailed May 7, 2013 (5 pages).

Non-final Office Action for U.S. Appl. No. 13/430,916, mailed Jan. 6, 2014 (36 pages).

Final Office Action for U.S. Appl. No, 13/430,916, mailed Jun. 13, 2014 (32 pages).

Non-final Office Action for U.S. Appl. No. 13/429,758, mailed Nov. 3, 2014 (26 pages).

Abstract of JP2007-519293 (2 pages).

* cited by examiner

☐ COMMUNICATION CHANNEL
◯ SEARCH CHANNEL

| FRAME TYPE | ADDRESS ID | TRANSMISSION SOURCE ID | COMMUNICATION CHANNEL INFORMATION |

| FRAME TYPE | ADDRESS ID | TRANSMISSION SOURCE ID | NETWORK INFORMATION |

COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

CROSS REFERENCE TO RELATED APPLICATION

The disclosure of Japanese Patent Application No. 2012-001423, filed on Jan. 6, 2012, is incorporated herein by reference.

FIELD

The exemplary embodiments relate to a communication system, a communication apparatus, a computer-readable storage medium having stored therein a communication program, and a communication method.

BACKGROUND AND SUMMARY

Conventionally, in a communication system, a communication apparatus performing wireless communication may execute scanning for searching for a connection destination.

However, in executing the scanning, if such a conventional communication apparatus cannot receive a response signal from a scan target, the scan target repeatedly transmits the response signal, thus causing fruitless transmission and reception. In addition, when the communication apparatus performing the scanning cannot receive a response signal from the scan target, the efficiency of the scanning is deteriorated.

Therefore, a feature of the exemplary embodiments provides a communication system, a communication apparatus, a computer-readable storage medium having stored therein a communication program, and a communication method that are capable of suppressing fruitless communication caused when a communication apparatus searches for another communication apparatus, and have increased efficiency of searching.

The exemplary embodiments have the following aspects in order to solve the above problem.

A communication system according to one aspect of the exemplary embodiments includes: a plurality of communication apparatuses, including a search communication apparatus configured to search for another communication apparatus. The search communication apparatus comprises a search request transmission section configured to transmit a search request signal by using a first channel. The search request signal includes information about a second channel different from the first channel.

According to the above aspect, the search request signal includes information about the second channel different from a channel (the first channel) used for transmission of the search request signal. Therefore, by transmitting the search request signal, the information about the second channel is recognized by other apparatuses.

In another aspect, the search communication apparatus may further comprise a use channel determination section configured to select a channel to be used as the second channel from a plurality of predetermined channels in accordance with the ambient communication condition. In this case, the second channel is used for communication other than transmission of the search request signal, and the first channel is one, of the plurality of predetermined channels, that is other than the second channel.

According to the above aspect, the second channel is determined in accordance with the ambient communication condition, instead of being a predetermined channel set in advance. Therefore, the information about a channel (second channel) used by the search communication apparatus for communication other than transmission of the search request signal cannot be recognized by other apparatuses in advance. However, the information about the second channel is recognized by the search communication apparatus transmitting the search request signal.

In another aspect, the search communication apparatus may further comprise a channel switching section configured to switch a channel used for communication. In this case, the channel switching section switches the channel used for communication to the first channel, at the start of a search period in which the search request transmission section can transmit the search request signal, during communication using the second channel, and switches the channel used for communication to the second channel at the end of the search period.

According to the above aspect, during communication using the second channel, the search communication apparatus switches the channel used for communication to the first channel and uses the first channel only during the search period in which the search request signal can be transmitted. Thus, the search communication apparatus can perform communication other than the searching, by using the second channel, during a period other than the search period, in which the search request signal is not transmitted.

In another aspect, the communication system may further include a search subject communication apparatus which is searched for by the search communication apparatus. In this case, the search subject communication apparatus comprises: a search request reception section configured to receive the search request signal; and a search response transmission section configured to transmit, to the search communication apparatus, a search response signal which is a response to the search request signal received by the search request reception section. The search response transmission section transmits the search response signal by using the second channel, based on the information about the second channel included in the search request signal.

According to the above aspect, the search subject communication apparatus transmits the search response signal by using the second channel. Therefore, after the search period has ended, even if the search communication apparatus is performing another communication by using the second channel, the search communication apparatus can receive the search response signal transmitted by the search subject communication apparatus, by using the second channel. That is, even if the search period is short (the period during which the search communication apparatus uses the first channel is short), the search communication apparatus can receive the search response signal by using the second channel, whereby the efficiency of the searching is increased. In addition, since the search subject communication apparatus transmits the search response signal by using the second channel, the search subject communication apparatus can be prevented from continuing to transmit, in vain, a search response signal that the search communication apparatus cannot receive.

In another aspect, the communication system may further include a search subject communication apparatus which is searched for by the search communication apparatus. In this case, the search subject communication apparatus comprises: a search request reception section configured to receive the search request signal; and a search response transmission section configured to transmit, to the search communication apparatus, a search response signal which is a response to the search request signal received by the search request reception section. The search request transmission section transmits information indicating a search period in which the search request signal can be transmitted. The search request reception section receives the information indicating the search period transmitted from the search communication apparatus.

According to the above aspect, the search subject communication apparatus can receive information about the search period, in addition to information about the second channel. Thus, the search subject communication apparatus can recognize the period during which the search communication apparatus uses the first channel. Therefore, the search subject communication apparatus can adjust the period for transmission of the search response signal and/or the channel to be used for the transmission, such that the search response signal can reach (be received by) the search communication apparatus. Thus, the efficiency of the searching by the search communication apparatus is increased, and the search subject communication apparatus can be prevented from continuing to transmit, in vain, a search response signal that the search communication apparatus cannot receive.

In another aspect, based on the information indicating the search period, the search response transmission section may transmit the search response signal by using the first channel, in the search period, and transmit the search response signal by using the second channel, after the search period has elapsed.

According to the above aspect, in the search period, the search subject communication apparatus transmits the search response signal by using the first channel. Therefore, in the search period, the search communication apparatus, which uses the first channel during the search period, can receive the search response signal. In addition, after the search period has elapsed, the search subject communication apparatus transmits the search response signal by using the second channel. Therefore, after the search period has elapsed, the search communication apparatus, which uses the second channel after the search period has elapsed, can receive the search response signal. Thus, the efficiency of the searching by the search communication apparatus is increased, and the search subject communication apparatus can be prevented from continuing to transmit, in vain, a search response signal that the search communication apparatus cannot receive.

In another aspect, based on the information indicating the search period, the search response transmission section may not transmit the search response signal in the search period, and may transmit the search response signal by using the second channel, after the search period has elapsed.

According to the above aspect, in the search period, the search subject communication apparatus does not transmit the search response signal Therefore, the search communication apparatus does not need to wait for the search response signal in the search period. Therefore, the search period can be finished in a short period. After the search period has ended, the search subject communication apparatus transmits the search response signal by using the second channel Thus, it is ensured that the search response signal reaches (is received by) the search communication apparatus in the period during which the search communication apparatus uses the second channel. Thus, the efficiency of the searching by the search communication apparatus is increased, and the search subject communication apparatus can be prevented from continuing to transmit, in vain, a search response signal that the search communication apparatus cannot receive.

In another aspect, the information indicating the search period may be included in the search request signal, and may be transmitted by the search request transmission section.

According to the above aspect, by receiving the search request signal, the search subject communication apparatus can recognize the search period (that is, the period during which the search communication apparatus uses the first channel).

In another aspect, the search request transmission section may transmit a search end notification signal as the information indicating the search period, at the end of the search period.

According to the above aspect, the search subject communication apparatus can recognize, as the search period (that is, the period during which the search communication apparatus uses the first channel), the period from when the search request signal has been received to when the search end notification signal is received.

In the above, the exemplary embodiments are described using a communication system as an example. However, the exemplary embodiments may be applied to a communication apparatus, a computer-readable storage medium having stored therein a communication program, or a communication method.

According to the exemplary embodiments, it is possible to provide a communication system and the like that are capable of suppressing fruitless communication caused when a communication apparatus searches for another communication apparatus, and have increased efficiency of searching.

These and other objects, features, aspects and advantages of the exemplary embodiments will become more apparent from the following detailed description when taken in conjunction with the accompanying drawings.

DETAILED DESCRIPTION OF NON-LIMITING EXAMPLE EMBODIMENTS (Embodiment)

Hereinafter, an embodiment will be described with reference to the drawings. In the present embodiment, a communication system will be described as an example, but the exemplary embodiments are not limited thereto. A communication apparatus that realizes the function of such a communication system, a communication method performed in such a communication system, or a computer-readable storage medium having stored therein a communication program to be executed in such a communication system, may be used.

(Configuration of Hardware of Game Apparatus)

The communication system of the present embodiment is composed of a plurality of communication apparatuses capable of performing wireless communication. In the present embodiment, a game apparatus 10 of hand-held type having a wireless communication function is used as an example of the communication apparatus.

Figure 1:
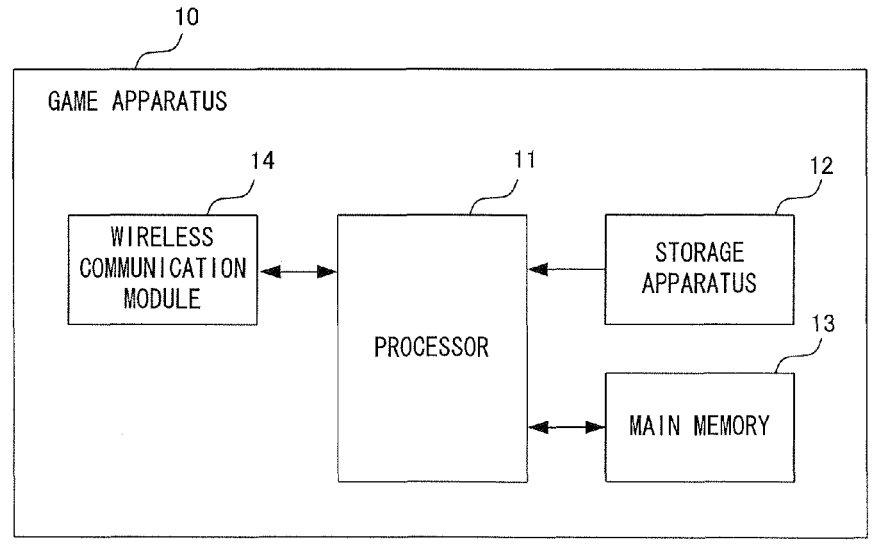
FIG. 1 is a block diagram showing a non-limiting example of the configuration of a game apparatus 10.

FIG. 1 is a block diagram showing a non-limiting example of the configuration of the game apparatus 10. As shown in FIG. 1, the game apparatus 10 includes a processor 11, a storage apparatus 12, a main memory 13, and a wireless communication module 14.

The storage apparatus 12 has stored therein a computer program that is executed by the processor 11. The storage apparatus 12 is, typically, a hard disk or a ROM (Read Only Memory). The main memory 13 temporarily stores a computer program or various data, and also functions as a work area of the processor 11. It is noted that a computer program or data stored in an external storage apparatus may be provided via a communication line or the like to the main memory 13 or the storage apparatus 12, so that the main memory 13 or the storage apparatus 12 stores it.

In addition, the main memory 13 stores a transmission frame or the like in which data to be transmitted to another game apparatus 10 or the like is written. The transmission frame stored in the main memory 13 is outputted to the wireless communication module 14, in accordance with an instruction from the processor 11, and is transmitted via the wireless communication module 14 to another game apparatus 10 or the like. In addition, a reception frame in which data received via the wireless communication module 14 from another game apparatus 10 or the like is written is processed by the processor 11, and is stored in the main memory 13 as appropriate. In addition, the storage apparatus 12 of the game apparatus 10 has stored therein apparatus information (apparatus ID) which is identification information about the game apparatus 10, in a nonvolatile manner. The apparatus ID is written as a transmission source ID in the transmission frame when the transmission frame is transmitted to another game apparatus 10 or the like.

The wireless communication module 14 has a function of establishing connection to a wireless LAN, thereby performing wireless communication with other game apparatuses 10 of the same type, or transmitting data to or receiving data from other apparatuses via the Internet. The wireless communication module 14 outputs the reception frame that has been received, to the processor 11. In addition, the wireless communication module 14 transmits the transmission frame or the like to another game apparatus 10 or the like, as instructed by the processor 11. It is noted that the wireless communication module 14 performs wireless communication by using a channel (wireless communication path) designated in accordance with the ambient communication condition by the processor 11.

It is noted that the above-described configuration of hardware is merely an example. The exemplary embodiments are applicable to any communication apparatus, or any communication system including any communication apparatuses.

(Summary of Communication System)

Figure 2:
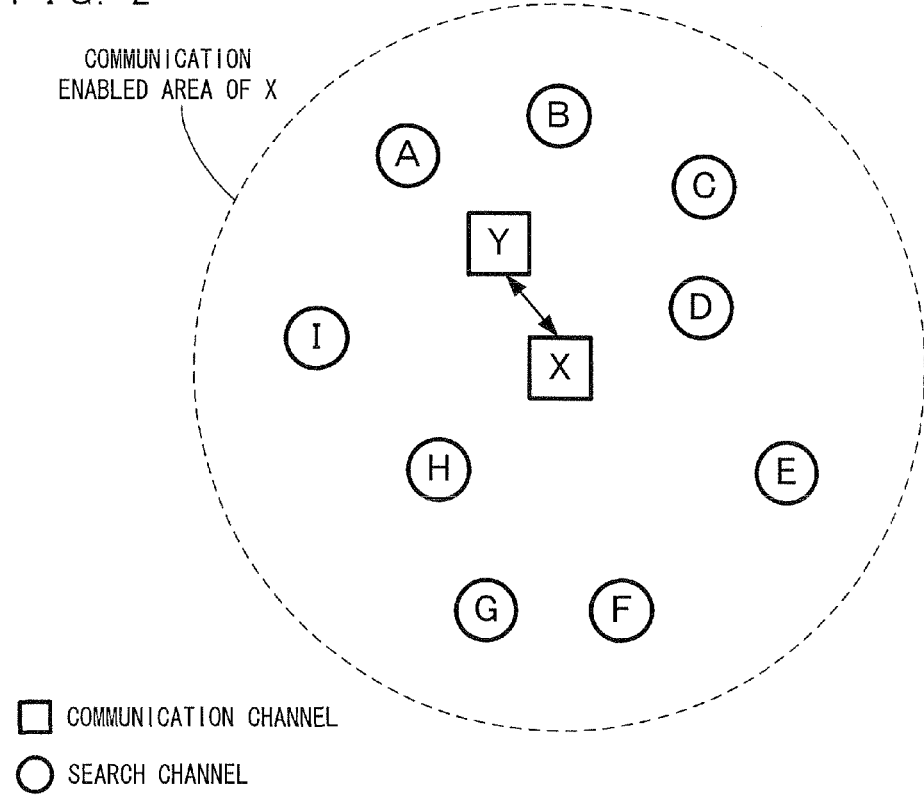
FIG. 2 is a conceptual diagram showing a non-limiting example of wireless communication performed in a communication system including a plurality of the game apparatuses 10.

First, the summary of a communication system of the present embodiment will be described. FIG. 2 is a conceptual diagram showing a non-limiting example of wireless communication performed in the communication system including a plurality of the game apparatuses 10 (game apparatuses X, Y, and A to I).

In the communication system shown in FIG. 2, the game apparatus X is executing a communication game, wirelessly communicating with the game apparatus Y. Here, a channel used for wireless communication by the game apparatus 10 (use channel) is selected from predetermined several channels (for example, 1Ch, 2Ch, and 3Ch) set in the communication system, in accordance with the ambient communication condition (for example, radio wave usage rate of the channel). Hereinafter, it will be assumed that a channel used by the game apparatus X for wirelessly communicating with the game apparatus Y is 1Ch. It is noted that, in the following description, a use channel that a game apparatus uses in wireless communication for transmitting and receiving a game program or game data in order to execute a communication game with another game apparatus, is referred to as a communication channel.

As shown in FIG. 2, in the communication enabled area in which wireless communication with the game apparatus X can be performed, the game apparatus Y which is wirelessly communicating with the game apparatus X by using a communication channel, and the other game apparatuses. A to I are present. When the game apparatus X searches for, other than the game apparatus Y, a game apparatus 10 that the game apparatus X can communicate with around the game apparatus X, the game apparatus X transmits a transmission frame (search request signal) indicating the presence of the game apparatus X and the content of the search request, by broadcast. That is, in the present embodiment, the game apparatus X functions as a search communication apparatus.

However, since the game apparatus X is communicating with the game apparatus Y by using the communication channel, even if the game apparatus X transmits the search request signal by broadcast using the communication channel, the game apparatus X cannot search for another game apparatus 10 that uses a different channel (2Ch or 3Ch) from the communication channel. Therefore, the game apparatus X switches the use channel from the communication channel (1Ch) to another channel (2Ch or 3Ch), and transmits a search request signal by broadcast. As a result, the search request signal can reach another game apparatus 10 that uses a different channel (2Ch or 3Ch) from the communication channel. Thus, the game apparatus X can search for another game apparatus 10 that uses a different channel.

Hereinafter, it will be assumed that the use channel of the game apparatuses A to I (search subject communication apparatuses in the present embodiment) is 2Ch, and that the game apparatus X switches its use channel from 1Ch to 2Ch to transmit a search request signal by broadcast. In addition, when a game apparatus (game apparatus X) executing a communication game by using a communication channel transmits a search request signal, a use channel (2Ch) to be used by the game apparatus by switching the communication channel is referred to as a search channel.

Figure 3:
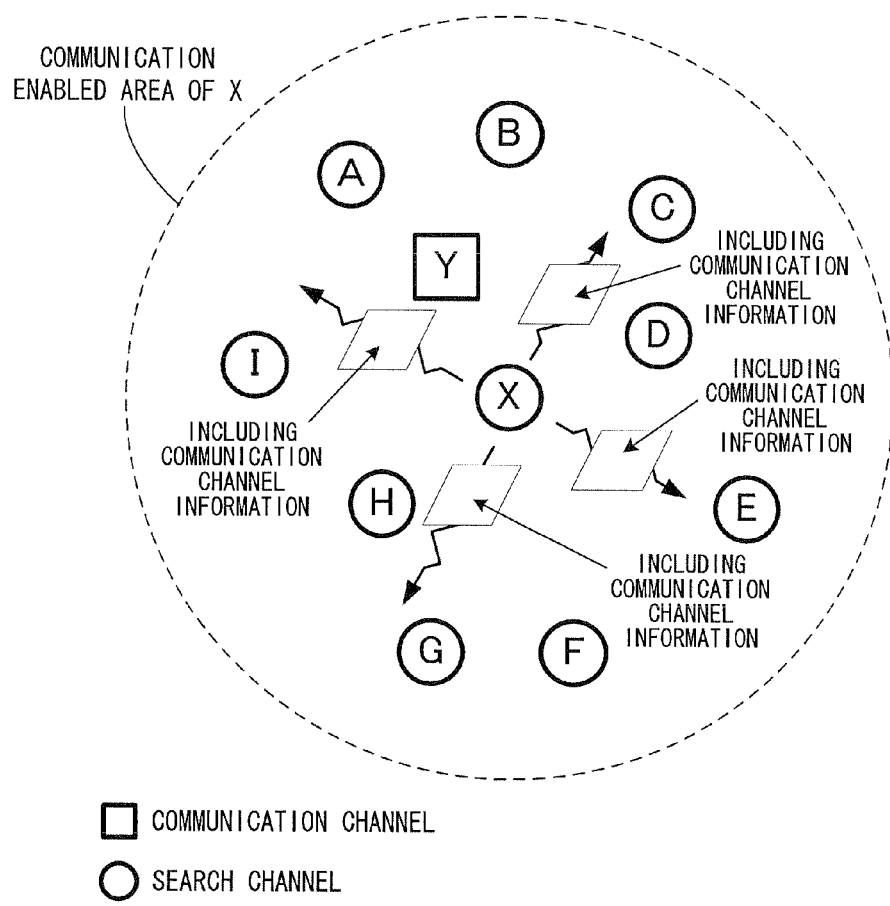
FIG. 3 is a conceptual diagram showing a non-limiting example of wireless communication performed in the communication system including the plurality of game apparatuses 10.

As shown in FIG. 3, the game apparatus X switches the use channel from the communication channel (1Ch) to a search channel (2Ch), and transmits a search request signal, thereby searching for the game apparatuses A to I that use 2Ch. Meanwhile, when the use channel has been switched, the game apparatus X becomes unable to communicate with the game apparatus Y which the game apparatus X has been communicating with by using the communication channel (1Ch) until then. Therefore, it is preferable that the period of using a search channel switched from a communication channel is short, and that the use channel will be switched (returned) to the communication channel soon, so that the communication game performed with the communication apparatus Y will not be disturbed. Therefore, the period during which the game apparatus X can use a search channel by switching the use channel is short, in other words, the game apparatus X can use a search channel by switching the use channel, only during a limited period of intervals in the communication with the game apparatus Y.

The search request signal transmitted by broadcast by using the search channel (2Ch) reaches (is received by) the game apparatuses A to I that use 2Ch. Then, for example, when the game apparatus I transmits, as a response to the search request signal, a transmission frame (search response signal) indicating the presence of the game apparatus I and the content of the search response, to the game apparatus X, it will be assumed that the game apparatus I uses its use channel (2Ch) without changing it. In this case, since the period during which the game apparatus X can use the search channel (2Ch) by switching its use channel is short, if the transmission of the search response signal by the game apparatus I is late, maybe the use channel of the game apparatus X will have already returned to the communication channel (1Ch) when the search response signal is transmitted from the game apparatus I to the game apparatus X. Thus, in the case where a search response signal using a search channel (2Ch) is transmitted from the game apparatus I after the use channel of the game apparatus X has returned to a communication channel (1Ch), the game apparatus X cannot receive the search response signal. In such a case, the game apparatus I transmits a search response signal in vain, whereby communication is performed in vain, and the efficiency of the searching by the game apparatus X is deteriorated. Therefore, in the communication system of the present embodiment, the communication channel (1Ch) is used for transmission of a search response signal.

As shown in FIG. 3, the game apparatus X switches the use channel to the search channel and transmits a search request signal by broadcast. At this time, in addition to information indicating the presence of the game apparatus X and the content of the search request, information indicating the communication channel (1Ch) that the game apparatus X uses for communication with the game apparatus Y is written in the search request signal (transmission frame).

The game apparatuses A to I receive the search request signal from the game apparatus X, and acquire information about the communication channel (1Ch) of the game apparatus X. It is noted that the communication channel of the game apparatus X is selected in accordance with the ambient communication condition when the game apparatus X starts a communication game with the game apparatus Y. Therefore, the game apparatuses A to I cannot recognize in advance the information about the communication channel. However, since the information about the communication channel of the game apparatus X is transmitted being included in the search request signal from the game apparatus X, the game apparatuses A to I can recognize the information about the communication channel of the game apparatus X by receiving the search request channel.

Figure 4:
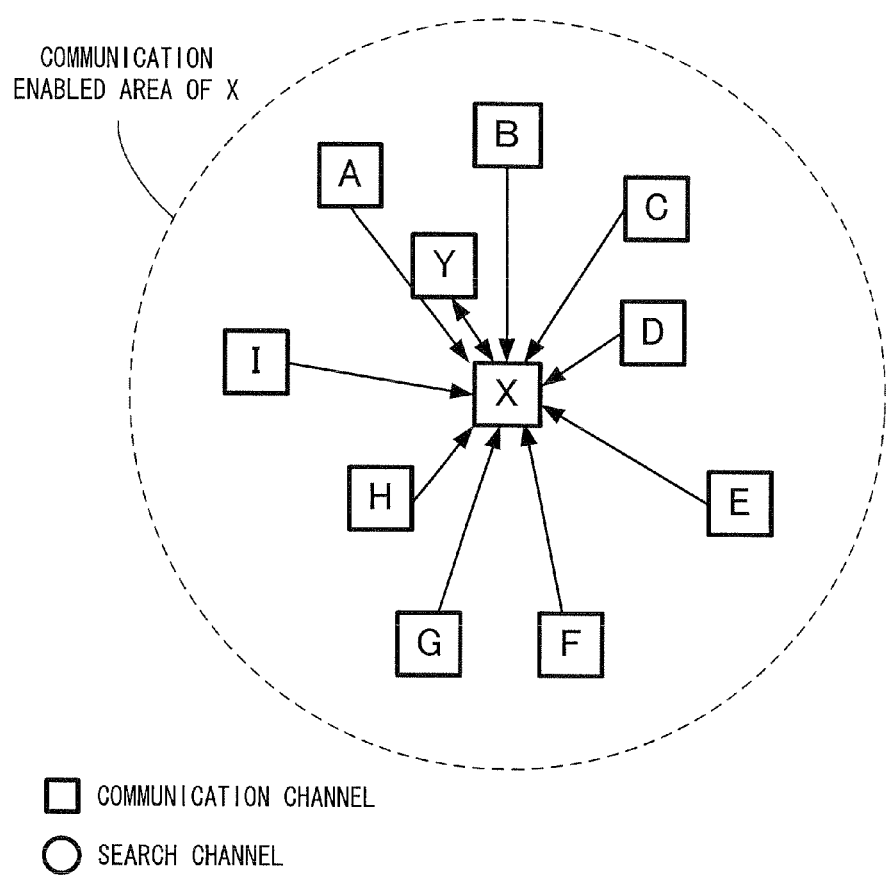
FIG. 4 is a conceptual diagram showing a non-limiting example of wireless communication performed in the communication system including the plurality of game apparatuses 10.

Thereafter, as shown in FIG. 4, the game apparatus X switches the use channel from the search channel (2Ch) to the communication channel (1Ch), and restarts communication with the game apparatus Y. Then, the game apparatuses A to I transmit search response signals by using the communication channel (1Ch). That is, the game apparatuses A to I are controlled so as to transmit search response signals by using the communication channel, by search response signal transmission control means which control the transmission of a search response signal. Therefore, after the game apparatus X switches the use channel to the communication channel (1Ch), the game apparatus X can receive a search response signal which is a response to the search request signal transmitted by using the search channel (2Ch). It is noted that the game apparatuses A to I transmit the search response signals in the order corresponding to the priorities of transmission randomly set for the respective game apparatuses 10, so as not to cross the lines.

Figure 5:
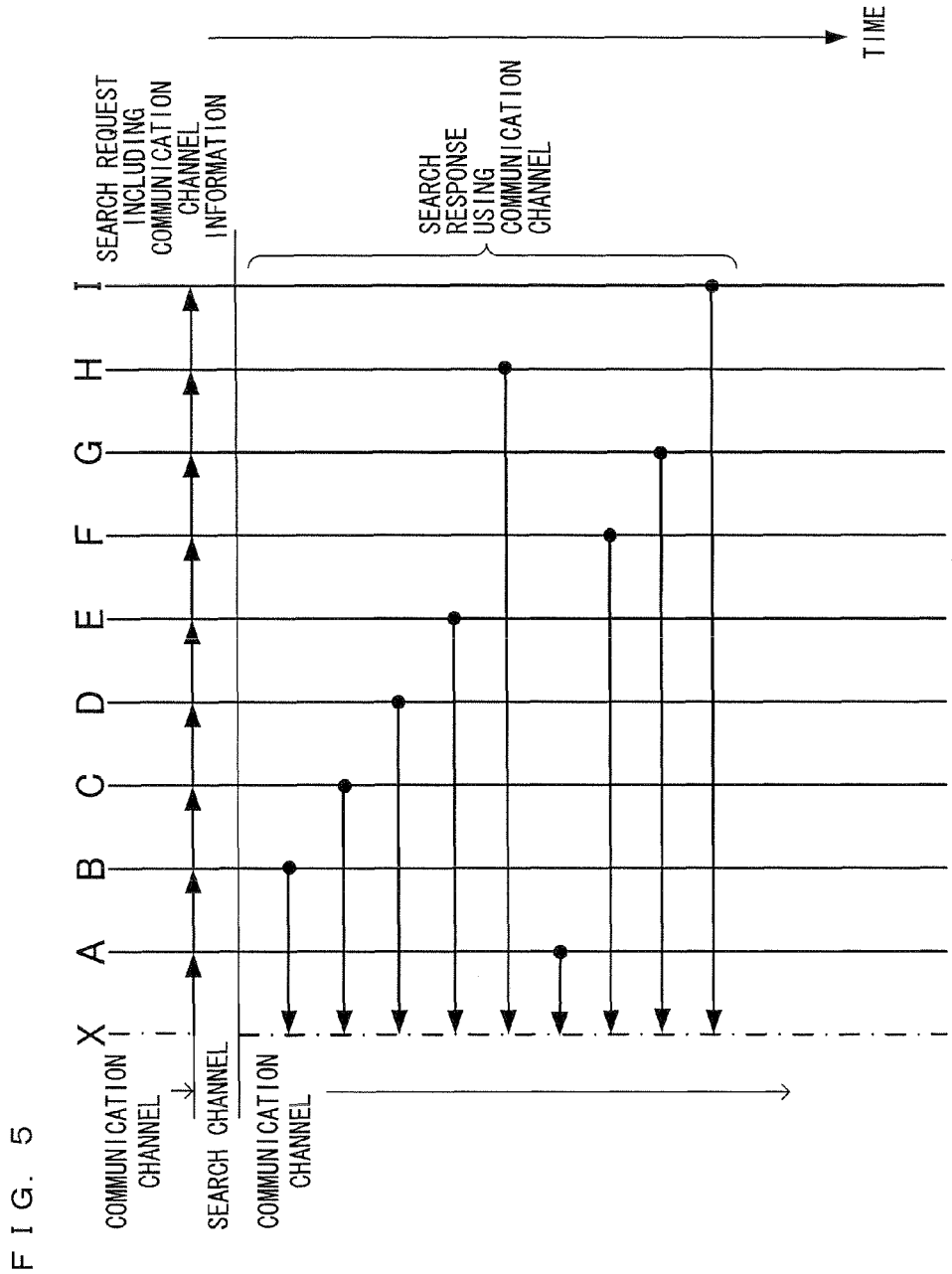
FIG. 5 is a conceptual diagram showing, in chronological order; a non-limiting example of wireless communication performed in the communication system including the plurality of game apparatuses 10.

FIG. 5 shows a non-limiting example of wireless communication in the above communication system in chronological order. It is noted that the order of the priorities of transmission of search response signals set for the game apparatuses A to I are, starting from the highest one, B→C→D→E→H→A→F→G→I.

As shown in FIG. 5, the game apparatus X which has used the communication channel (1Ch) switches the use channel to the search channel (2Ch), and transmits the search request signal including information about the communication channel (1 Ch) that the communication apparatus X currently uses for communication with the game apparatus Y. It is noted that the period in which the game apparatus X (search communication apparatus) can transmit the search request signal (hereinafter, referred to as a search period) will be assumed to be short. Therefore, when the game apparatuses A to I that have received the search request signal transmits search response signals as a response to the search request signal, the search period of the game apparatus X has ended and the use channel of the game apparatus X has returned to the communication channel (1Ch).

Then, the game apparatuses A to I that have received the search request signal sequentially transmit search response signals to the game apparatus X by using the communication channel. Here, since the use channel of the game apparatus X has been already switched to the communication channel (1Ch), the game apparatus X can receive the search response signals from the game apparatuses A to I and recognize the presences of the game apparatuses A to I. Thus, the efficiency of the searching by the game apparatus X is increased, and the game apparatuses A to I can be prevented from continuing to transmit, in vain, search response signals that the game apparatus X cannot receive.

It is noted that the search period is not limited to the period in which the search request signal is transmitted. The search period may include a predetermined period after the search request signal has been transmitted.

(Memory Map)

Figure 6:
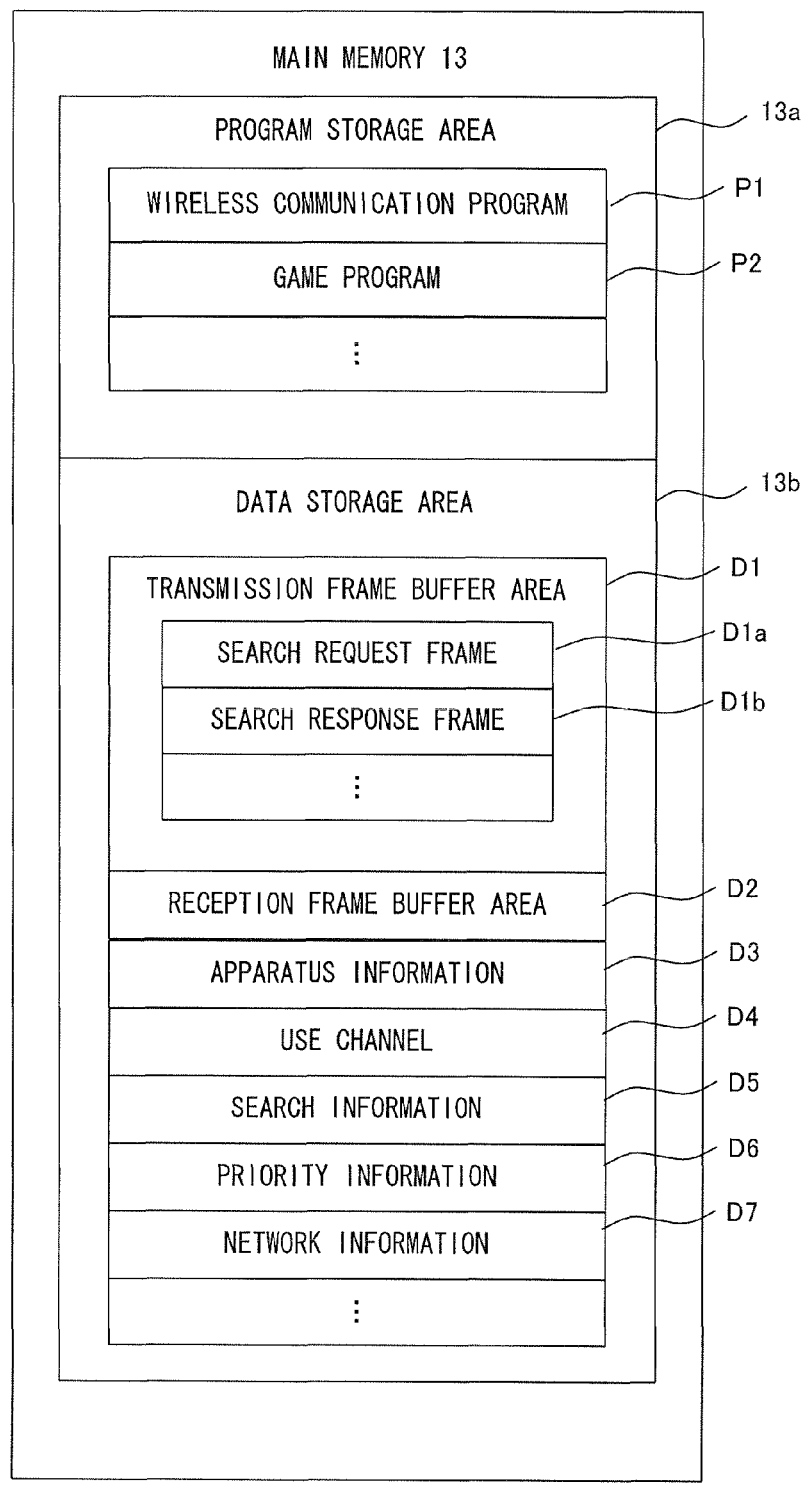
FIG. 6 shows a non-limiting example of a memory map of a main memory 13.

Next, with reference to FIG. 6, various programs and various pieces of data to be stored in the main memory 13 (i.e., the memory map) will be described. As shown in FIG. 6, the main memory 13 includes: a program storage area 13a in which a program loaded from the storage apparatus 12, a program acquired via communication lines from an external storage apparatus, or the like is to be stored; and a data storage area 13b in which temporary data generated in a game process or a communication process is to be stored.

A wireless communication program P1, a game program P2, and the like are to be stored in the program storage area 13a. The wireless communication program P1 is a program defining the whole wireless communication process. If execution of the wireless communication program P1 is started, the wireless communication process is started. The game program P2 is a program defining the whole game process executed by the game apparatus 10.

The data storage area 13b includes a transmission frame buffer area D1 and a reception frame buffer area D2. Apparatus information D3, use channel information D4, search information D5, priority information D6, network information D7, and the like are to be stored in the data storage area 13b.

A search request frame D1a, a search response frame D1b, and the like are to be stored in the transmission frame buffer area D1. When the game apparatus 10 transmits data to another game apparatus 10, a transmission frame prepared in the transmission frame buffer area D1 is used. The reception frame buffer area D2 is a buffer area for, when the transmission frame transmitted from another game apparatus 10 has been received, temporarily storing the transmission frame.

The apparatus information D3 is identification information (ID information) of the game apparatus 10. The use channel information D4 indicates a channel used when the game apparatus 10 communicates with another game apparatus 10, and includes information about the communication channel or information about the search channel. The search information D5 is identification information about a communication game (an example of applications) that is being executed by wireless communication using a communication channel. The priority information D6 indicates the priority for determining the order of transmission of a transmission frame or the like to another game apparatus 10. The network information D7 is information about a network that the game apparatus 10 forms together with another game apparatus 10 (for example, information about the total number of the game apparatuses 10 included in the same network).

(Structure of Transmission Frame)

Figures 7A, 7B, 8:
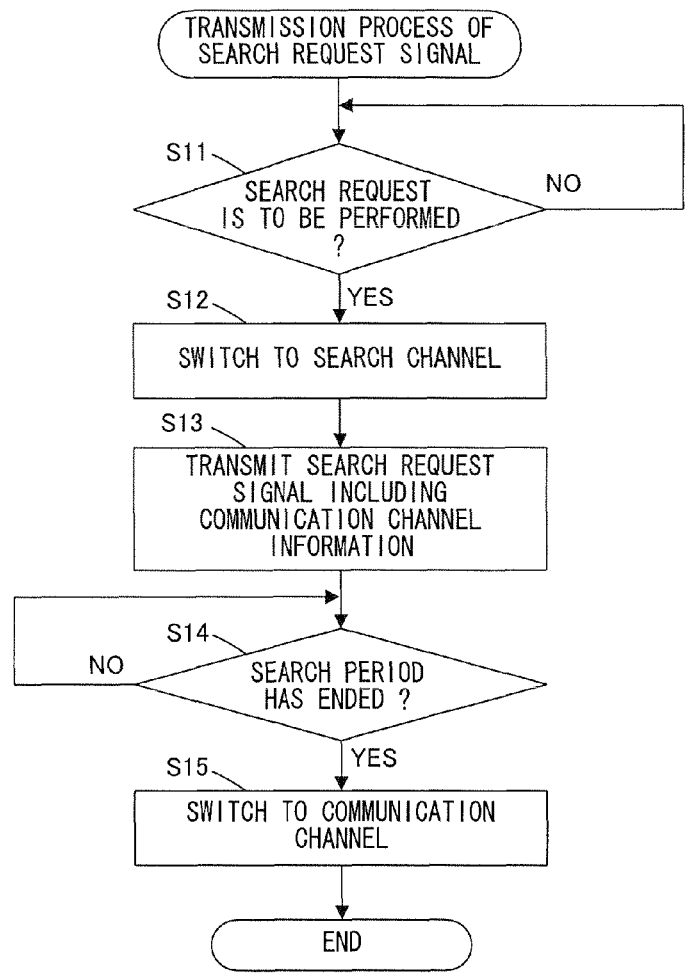
FIG. 7A and FIG. 7B show non-limiting examples of a search request frame and a search response frame.
FIG. 8 is a flowchart showing a non-limiting example of a transmission process of a search request signal.

Next, with reference to FIG. 7A and FIG. 7B, the structures of the transmission frames will be described. FIG. 7A shows a non-limiting example of the structure of the search request frame D1a, and FIG. 7B shows a non-limiting example of the structure of the search response frame D1b.

The search request frame D1a is transmitted as a search request signal by broadcast when the game apparatus 10 searches for another game apparatus 10. As shown in FIG. 7A, the search request frame D1a includes a frame type, an address ID, a transmission source ID, and communication channel information. The frame type indicates the type of the transmission frame. In this case, information indicating the search request frame D1a is written in the frame type. In the address ID, identification information about another game apparatus 10 as a transmission destination is written. Since the search request frame D1a is transmitted by broadcast, identification information that allows all the game apparatuses 10 to receive the frame is written in the address ID. In the transmission source ID, identification information about the game apparatus 10 that transmits the search request frame D1a is written based on the apparatus information D3 stored in the data storage area 13b. In the communication channel information, the communication channel used by the game apparatus 10 that transmits the search request frame D1a is written based on the use channel information D4 stored in the data storage area 13b.

The search response frame D1b is transmitted by the game apparatus 10 that has received the search request frame D1a, to the game apparatus 10 that has transmitted the search request frame D1a. The search response frame D1b includes a frame type, an address ID, a transmission source ID, and network information. In this case, in the frame type, information indicating a search response frame is written. In the address ID, identification information indicating the game apparatus 10 that has transmitted the search request frame is written. In the transmission source ID, identification information indicating the game apparatus 10 that transmits the search response frame D1b is written. In the network information, information about a network that the game apparatus 10 forms together with another game apparatus 10 is written based on the network information D7 stored in the data storage area 13b. Owing to the above structure, the game apparatus 10 that has received the search response frame D1b can obtain information about a network that other game apparatuses 10 form, and based on the information, can select another game apparatus 10 to be connected.

Next, the flow of a process for transmitting the search request frame D1a, that is, a process for transmitting a search request signal will be described.

(Flow of Transmission Process of Search Request Signal)

With reference to FIG. 8, the transmission process of a search request signal executed by the processor 11 of the game apparatus 10 will be described. The transmission process of a search request signal shown in FIG. 8 is executed by the processor 11 of the game apparatus 10 executing the wireless communication program P1. Hereinafter, it will be assumed that the game apparatus X shown in FIG. 2 is the game apparatus 10 (search communication apparatus) that transmits a search request signal.

At first, the game apparatus X has been powered on, and is communicating with another game apparatus Y (see FIG. 2) by using a communication channel (1Ch), executing a communication game. Then, in step S11, the processor 11 of the game apparatus X determines whether or not to search for other game apparatuses A to I (see FIG. 2). Specifically, the processor 11 of the game apparatus X determines whether or not it is time to issue a search request, based on a predetermined timing (scan start timing) of issuing a search request. It is noted that the scan start timing may be periodic, or may be set as appropriate in accordance with a communication game. If the result of the determination is YES, the process proceeds to step S12. If the result of the determination is NO, the process returns to step S11 to repeat processing of step S11 until the scan start timing.

In step S12, the processor 11 of the game apparatus X switches the use channel from the communication channel (1Ch) to the search channel (2Ch). Then, the process proceeds to step S13.

In step S13, the processor 11 of the game apparatus X transmits a search request signal including information about the communication channel (1Ch) by using the search channel (2Ch). Specifically, the processor 11 of the game apparatus X may transmit, via the wireless communication module 14, the search request frame D1*a* stored in the transmission frame buffer area D1 of the main memory 13. Thus, a search request signal including the identification information about the game apparatus X, and the information about the communication channel currently used by the game apparatus X is transmitted by broadcast. Then, the process proceeds to step S14.

In step S14, the processor 11 of the game apparatus X determines whether or not the search period in which the search request signal is transmitted has ended. It is noted that the search period is set to be a predetermined period starting from the scan start timing and ending before the first search response signal is transmitted as a response to the search request signal transmitted in the search period. That is, the search period is set to be short. If the result of the determination is YES, the process proceeds to step S15. If the result of the determination is NO, the process returns to step S14 to repeat processing of step S14 until the search period ends.

In step S15, the processor 11 of the game apparatus X switches the use channel from the search channel (2Ch) to the communication channel (1Ch), and ends the transmission process of the search request signal.

It is noted that the above transmission process of a search request signal is executed with a predetermined period (e.g., every 1/30 second). If the scan start timing is periodic, the transmission process of a search request signal may be executed in accordance with the scan start timing. In this case, the determination processing of step S11 is omitted, and the process starts from step S12.

Next, the flow of a process for transmitting the search response frame D1*b*, that is, a process for transmitting a search response signal will be described.

(Flow of Transmission Process of Search Response Signal)

Figure 9:
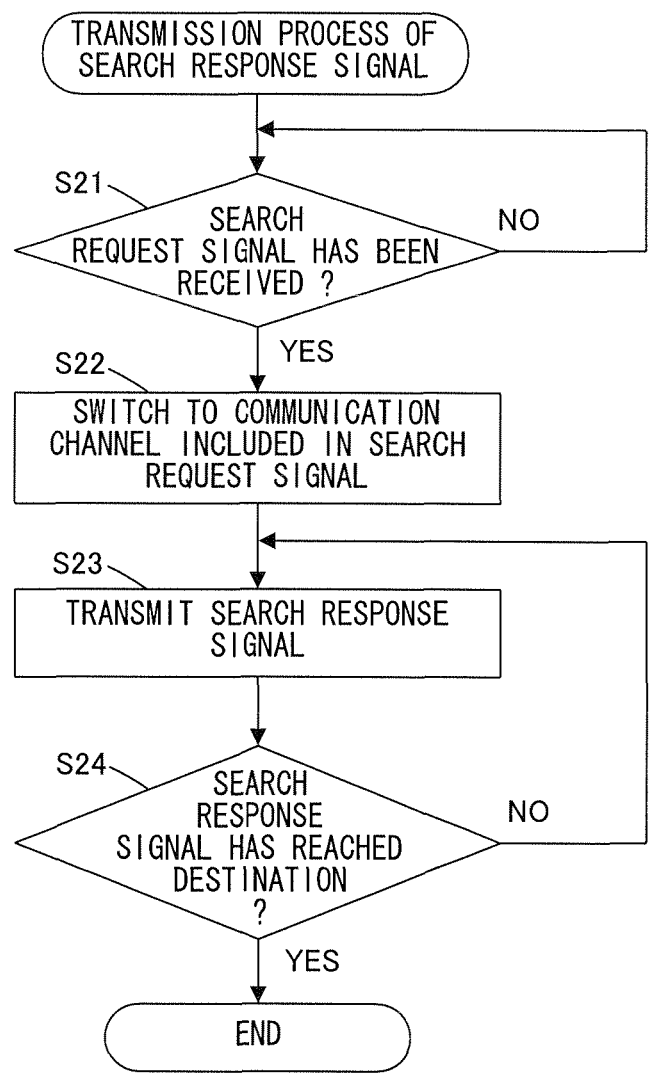
FIG. 9 is a flowchart showing a non-limiting example of a transmission process of a search response signal.

With reference to FIG. 9, the transmission process of a search response signal executed by the processor 11 of the game apparatus 10 will be described. The transmission process of the search response signal shown in FIG. 9 is executed by the processor 11 of the game apparatus 10 executing the wireless communication program Pl. Hereinafter, it will be assumed that the game apparatus A shown in FIG. 2 is the game apparatus 10 (search subject communication apparatus) that transmits a search response signal.

At first, the game apparatus A has been powered on, and is waiting to receive a search request signal, using the use channel (2Ch) designated by the processor 11 of the game apparatus A. Then, in step S21, the processor 11 of the game apparatus A determines whether or not a search request signal has been received. If the result of the determination is YES, the process proceeds to step S22. If the result of the determination is NO, the process returns to step S21 to repeat processing of step S21 until a search request signal is received.

In step S22, the processor 11 of the game apparatus A switches its use channel from the present channel (2Ch) to the communication channel (1Ch). Specifically, based on the search request signal received in step S21 (here, which will be assumed to be the search request signal transmitted from the game apparatus X), the processor 11 of the game apparatus A acquires information about the channel (1Ch) that the game apparatus X currently uses as the communication channel, and then switches the use channel of the game apparatus A to the communication channel (1Ch) that has been acquired. Then, the process proceeds to step S23.

In step S23, the processor 11 of the game apparatus A transmits a search response signal. Specifically, the processor 11 of the game apparatus A transmits the search response frame D1*b* stored in the transmission frame buffer area D1 of the main memory 13. Thus, the search response signal including the identification information about the game apparatus A, and network information is transmitted to the game apparatus X which has transmitted the search request signal. It is noted that the position, in the order of transmission, of the search response signal from the game apparatus A is determined based on the priority information D6 stored in the data storage area 13*b* of the game apparatus A. Then, the process proceeds to step S24.

In step S24, the processor 11 of the game apparatus A determines whether or not the search response signal has reached (has been received by) the game apparatus X which has transmitted the search request signal. If the result of the determination is YES, the process ends here. If the result of the determination is NO, the process returns to step S23. That is, the search response signal is repeatedly transmitted until the search response signal reaches the game apparatus X.

The processor 11 of the game apparatus X receives a search response signal that another game apparatus 10 has transmitted as a response to the search request signal that the game apparatus X has transmitted, and stores the search response signal in the main memory 13. Thus, the game apparatus X can recognize the presence of the other game apparatus 10.

As described above, when the game apparatus X transmits a search request signal, the game apparatus X transmits information about the communication channel (1Ch) of the game apparatus X, the information being included in the search request signal (step S13 in FIG. 8). Therefore, by receiving the search request signal from the game apparatus X (YES in step S21 in FIG. 9), the game apparatus A can acquire information about the communication channel (1Ch) of the game apparatus X, and switch the use channel of the game apparatus A to the channel (1Ch) that has been acquired (step S22 in FIG. 9). When the game apparatus A transmits a search response signal by using the switched channel (1Ch) (step S23 in FIG. 9), the search period of the game apparatus X has ended (YES in step S14 in FIG. 8), and the use channel of the game apparatus X has been switched to the communication channel (1Ch) (step S15 in FIG. 8). Therefore, the game apparatus X can receive the search response signal that the game apparatus A using the communication channel (1Ch) has transmitted. Thus, the efficiency of the searching by the game apparatus X is increased, and the game apparatus A can be prevented from transmitting, in vain, a search response signal that the game apparatus X cannot receive.

As described above, the use channel of the game apparatus X has been already switched to the communication channel (1Ch) when the game apparatus A transmits a search response signal, because the search period is short. However, even in the case where, when the game apparatus A has transmitted the search response signal by using the communication channel (1Ch) of the game apparatus X, the use channel of the game apparatus X has not yet been returned to the communication channel (1Ch) (that is, is still 2Ch), the use channel of the game apparatus X eventually returns to the communication channel (1Ch) soon. Therefore, the search response signal from the game apparatus A eventually reaches the game apparatus X soon. Thus, the search response signal can be prevented from continuing to be repeatedly transmitted without reaching the game apparatus X.

In addition, the game apparatus X may transmit information indicating the search period to the game apparatus A, and the game apparatus A that has received the information may not transmit a search response signal during the search period. That is, during the search period, the game apparatus A is controlled by the search response signal transmission control means so as not to transmit a search response signal. Thus, irrespective of the length of the search period, when the game apparatus X is using the search channel (2Ch), a search response signal is not transmitted by using the communication channel (1Ch). Therefore, such fruitless communication that the search response signal is repeatedly transmitted without reaching the game apparatus X during the search period, can be prevented.

In addition, the game apparatus X may transmit information indicating the search period to the game apparatus A, and the game apparatus A that has received the information may transmit a search response signal by using the search channel (2Ch) during the search period. That is, during the search period, the game apparatus A is controlled by the search response signal transmission control means so as to transmit a search response signal by using the search channel. Thus, irrespective of the length of the search period, during the search period in which the game apparatus X is using the search channel (2Ch), a search response signal is transmitted by using the search channel (2Ch) and the game apparatus X can receive the search response signal. Therefore, such fruitless communication that the search response signal is repeatedly transmitted without reaching the game apparatus X during the search period, can be prevented, and the efficiency of the searching by the game apparatus X is increased. Hereinafter, another embodiment (the first modification) in which a search response signal is transmitted by using a search channel during the search period will be described.

(First Modification)

Figure 10:
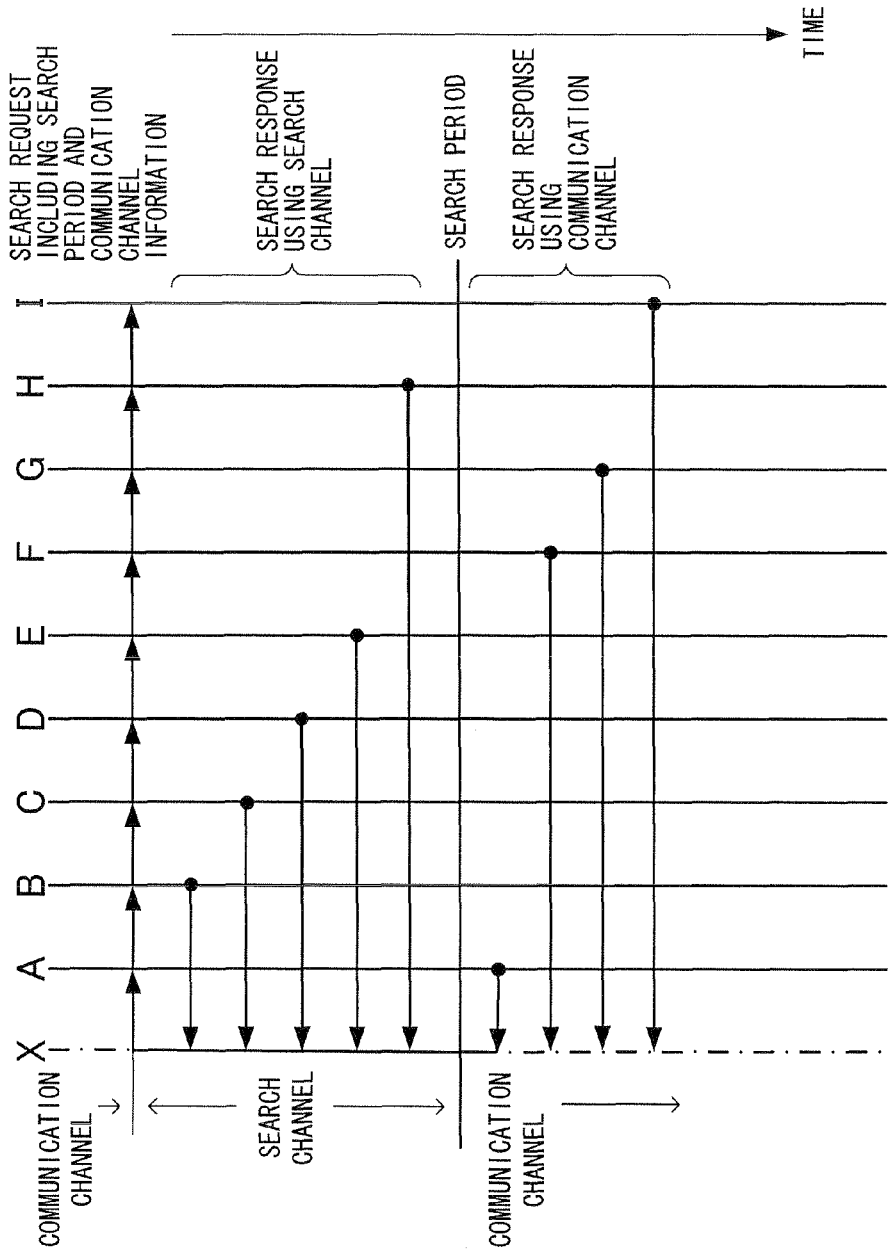
FIG. 10 is a conceptual diagram showing, in chronological order, a non-limiting example of modifications of wireless communication performed in the communication system including the plurality of game apparatuses 10.

With reference to FIG. 10, wireless communication performed in a communication system of the first modification will be described. In the above embodiment, the search request signal transmitted from the game apparatus X includes information about the communication channel used by the game apparatus X (search communication apparatus). In the first modification, the search response signal includes information about the search period in addition to the information about the communication channel.

FIG. 10 shows the wireless communication performed in the communication system of the first modification, in chronological order. It is noted that the order of the priorities of transmission of search response signals set for the game apparatuses A to I are, starting from the highest one, B→C→D→E→H→A→F→G→I.

As shown in FIG. 10, the game apparatus X which has used the communication channel (1Ch) switches the use channel to the search channel (2Ch), and transmits the search request signal including information about the communication channel (1Ch) that the game apparatus X currently uses for communication with the game apparatus Y, and information about the search period. It is noted that, here, the search period of the game apparatus X (search communication apparatus) is set so as to end after any one of the game apparatuses A to I transmits a search response signal.

Then, in the search period, the game apparatuses A to I which have received the search request signal transmit search response signals in the priority order, to the game apparatus X, by using the channel that has been used for the game apparatuses A to I to receive the search request signal (the same channel as the search channel, i.e., 2Ch). Here, the search period ends just before the game apparatus H has transmitted the search response signal by using the search channel (2Ch). Therefore, the other game apparatuses A, F, G, and I do not transmit search response signals by using the search channel (2Ch). After the search period has ended, the game apparatuses A, F, G, and I transmit search response signals by using the communication channel (1Ch) of the game apparatus X. Here, when the search period has ended, the game apparatus X has switched its use channel to the communication channel (1Ch). Therefore, the game apparatus X can receive the search response signals from the game apparatuses A, F, G, and I. Thus, whether in the search period or after the search period has ended, the game apparatus X can receive the search response signals from the game apparatuses A, F, G, and I, and recognize the presences of the game apparatuses A, F, G, and I. Thus, the efficiency of the searching by the game apparatus X is increased, and the game apparatuses A to I can be prevented from transmitting, in vain, search response signals that the game apparatus X cannot receive.

Figure 11:
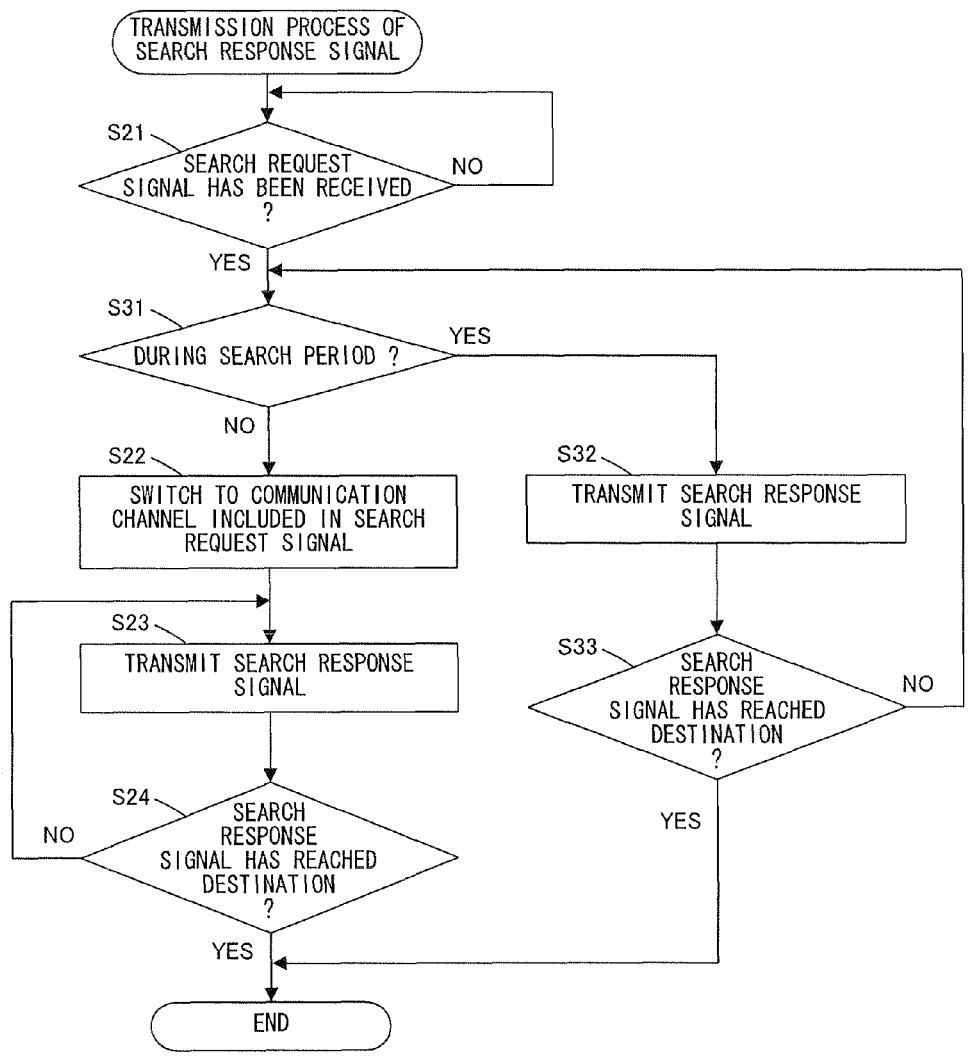
FIG. 11 is a flowchart showing a non-limiting example of modifications of the transmission process of a search response signal.

Next, with reference to FIG. 11, a transmission process of a search response signal executed by the processor 11 of the game apparatus 10, according to the first modification, will be described. In the first modification, information indicating the search period (not shown) is included in the search request frame D1a shown in FIG. 7A. Therefore, in the transmission process of a search request signal shown in FIG. 8, in step S13, a search request signal including information about the communication channel and information about the search period is transmitted. In the description below, it will be assumed that the game apparatus A shown in FIG. 2 is the game apparatus 10 (search subject communication apparatus) that transmits a search response signal. In FIG. 11, the same steps as those in the transmission process of a search response signal shown in FIG. 9 are denoted by the same reference numerals, and the description thereof will be omitted.

As shown in FIG. 11, in step S31, the processor 11 of the game apparatus A determines whether or not it is currently in the search period, based on the search request signal received in step S21. Specifically, the processor 11 of the game apparatus A determines whether or not it is currently in the search period, based on the information about the search period included in the search request frame D1a from the game apparatus X received in step S21. If the result of the determination is YES, the process proceeds to step S32. If the result of the determination is NO, the process proceeds to step S22 to switch the channel to the communication channel.

In step S32, the processor 11 of the game apparatus A transmits a search response signal. Specifically, the processor 11 of the game apparatus A transmits the search response frame D1b stored in the transmission frame buffer area D1 of the main memory 13, by using the channel by which the game apparatus A has received the search request signal in step S21 (the search channel; 2Ch). Thus, the search response signal including the identification information about the game apparatus A, and network information is transmitted to the game apparatus X which has transmitted the search request signal. Then, the process proceeds to step S33.

In step S33, the processor 11 of the game apparatus A determines whether or not the search response signal has reached (has been received by) the game apparatus X which has transmitted the search request signal. If the result of the determination is YES, the process ends here. If the result of the determination is NO, the process returns to step S31.

As described above, in the search period (YES in step S31 in FIG. 11), since the game apparatus A transmits a search response signal by using the search channel (2Ch) (step S32 in FIG. 11), the game apparatus X, which uses the search channel (2Ch) in the search period, can receive the search response signal. In addition, after the search period has ended (NO in step S31 in FIG. 11), since the game apparatus A transmits a search response signal by using the communication channel (1Ch) (steps S22 and S23 in FIG. 11), the game apparatus X, which uses the communication channel (1Ch) after the search period has ended, can receive the search response signal.

(Second Modification)

Figure 12:
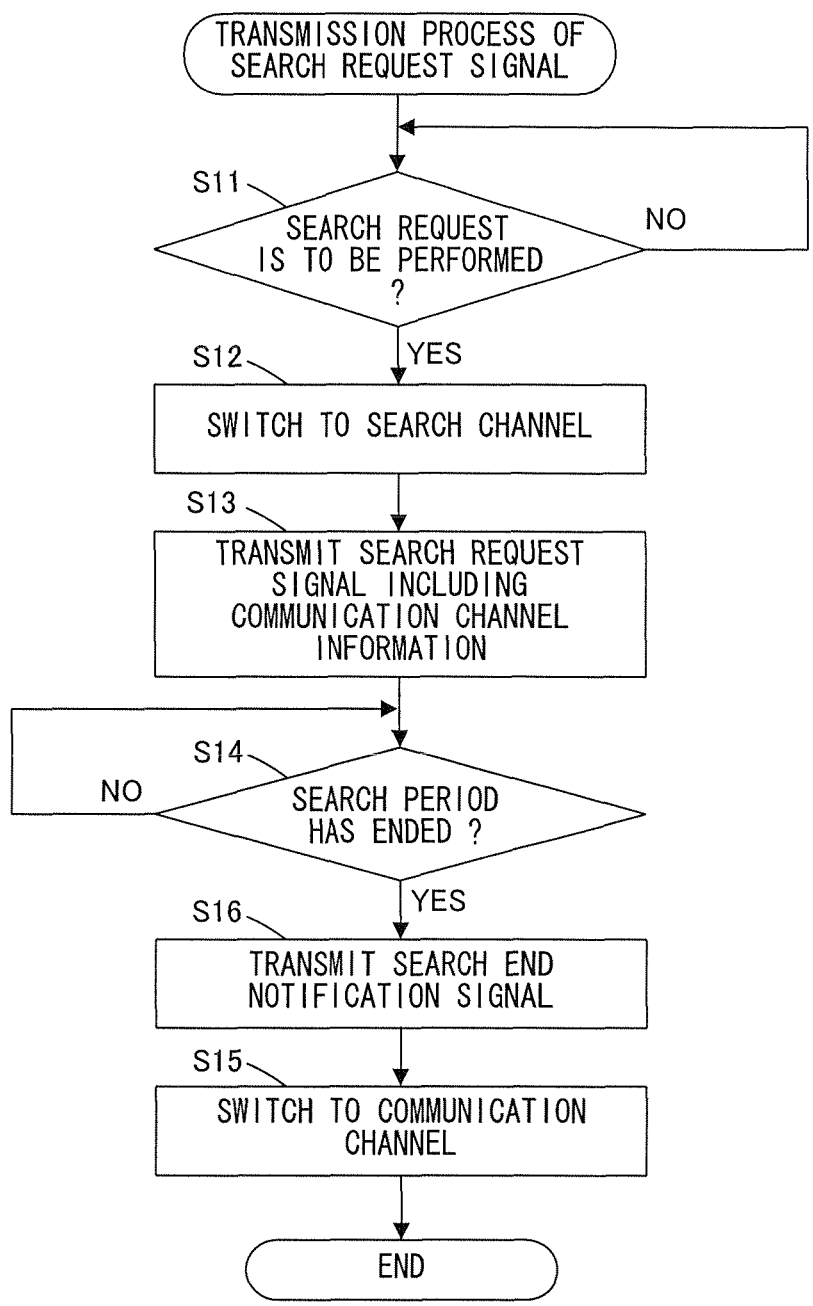
FIG. 12 is a flowchart showing a non-limiting example of modifications of the transmission process of a search request signal.

In the first modification, information indicating the search period is written in the search request frame D1a, which is transmitted as a search request signal. However, the information indicating the search period may not be directly included in a search request signal (search request frame D1a) as described above. In the second modification, for example, a search end notification frame (not shown) may be prepared in the transmission frame buffer area D1, and the transmission enabled period in which a search response signal can be transmitted may be determined by transmission of the search end notification frame. That is, when the game apparatuses A to I (search subject communication apparatuses) have received the search end notification frame transmitted from the game apparatus X (search communication apparatus), the search response signal transmission control means may control transmission of search response signals. It is noted that the search end notification frame is transmitted, by broadcast, as a search end notification signal for notifying other game apparatuses 10 that the search period has ended. FIG. 12 is a flowchart showing a non-limiting example of a transmission process of a search request signal, including a process in which the game apparatus X (search communication apparatus) shown in FIG. 2 transmits a search end notification signal to the game apparatuses A to I (search subject communication apparatus). In FIG. 12, the same steps as those in the transmission process of a search request signal shown in FIG. 8 are denoted by the same reference numerals, and the description thereof will be omitted.

As shown in FIG. 12, when the search period has ended (YES in step S14), in step S16, the processor 11 of the game apparatus X transmits a search end notification signal by using the search channel (2Ch). Specifically, the processor 11 of the game apparatus X transmits, via the wireless communication module 14, the search end notification frame (not shown) stored in the transmission frame buffer area D1 of the main memory 13. As a result, the other game apparatuses A to I are notified that the search period has ended. Then, the process proceeds to step S15.

Figure 13:
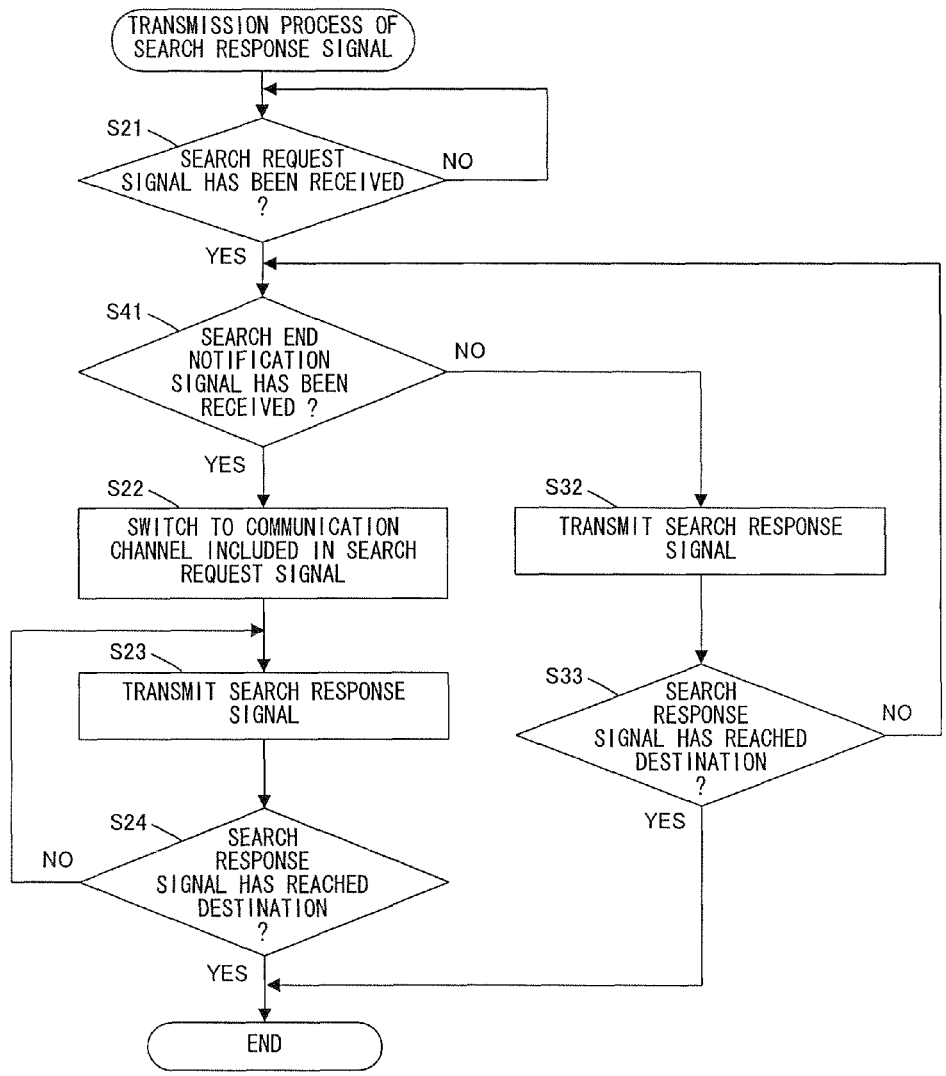
FIG. 13 is a flowchart showing a non-limiting example of modifications of the transmission process of a search response signal.

Next, with reference to FIG. 13, a transmission process of a search response signal executed by the processor 11 of the game apparatus 10 in the case where the above search end notification signal is transmitted will be described. FIG. 13 is a flowchart showing a non-limiting example of the transmission process of a search response signal, including a process in which the game apparatus A (search subject communication apparatus) shown in FIG. 2 receives the search end notification signal from the game apparatus X (search communication apparatus). In FIG. 13, the same steps as those in the transmission process of a search response signal shown in FIG. 11 are denoted by the same reference numerals, and the description thereof will be omitted.

As shown in FIG. 13, in step S41, the processor 11 of the game apparatus A determines whether or not the search end notification signal transmitted from the game apparatus X by broadcast has been received. If the result of the determination is YES, the process proceeds to step S22 (that is, the processor 11 of the game apparatus A switches the use channel to the communication channel). If the result of the determination is NO, the process proceeds to step S32 (that is, the processor 11 of the game apparatus A transmit the search response signal, the use channel remaining the search channel).

As described above, according to the second modification, during the period from when the game apparatus A has received a search request signal to when the game apparatus A receives a search end notification signal (YES in step S21 and NO in step S31 in FIG. 13), the game apparatus A transmits a search response signal by using the search channel (2Ch) (step S32 in FIG. 13). Therefore, in the search period (NO in step S14 in FIG. 12), in which the search end notification period has not yet been transmitted, the game apparatus X using the search channel (2Ch) can receive the search response signal. In addition, after the game apparatus A has received the search end notification signal (YES in step S41 in FIG. 13), the game apparatus A transmits the search response signal by using the communication channel (1Ch) (steps S22 and S23 in FIG. 13). Therefore, the game apparatus X using the communication channel (1Ch) after transmitting the search end notification signal (steps S16 and S15 in FIG. 12) can receive the search response signal. In the case where a predetermined period from when the game apparatus X has transmitted a search end notification signal to when the game apparatus A receives the search end notification signal is taken into consideration, a step of "waiting for the predetermined period" may be provided between step S16 and step S15 in FIG. 12 so that the game apparatus X can receive a search response signal transmitted using the search channel in the predetermined period.

(Third Modification)

Figure 14:
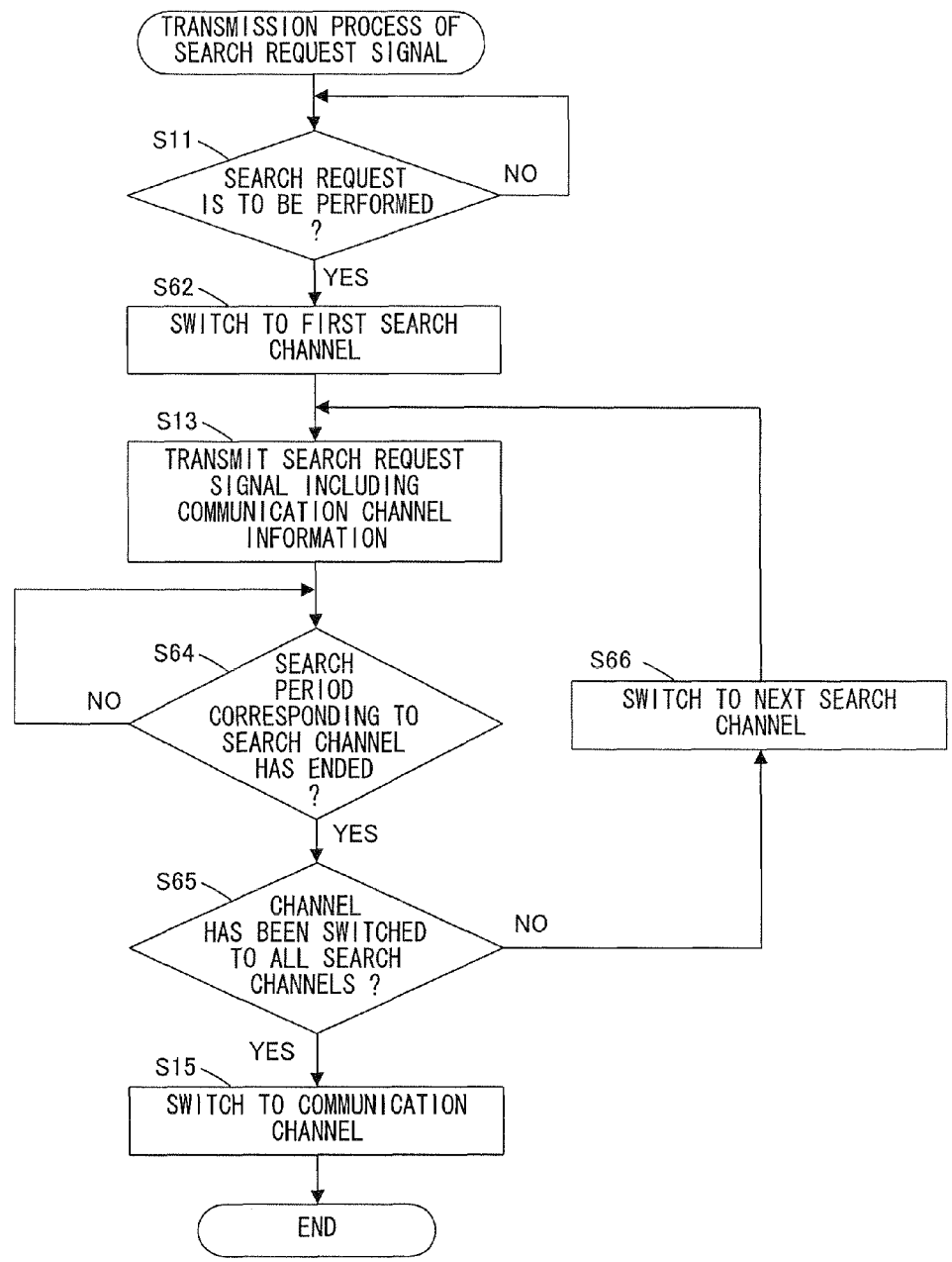
FIG. 14 is a flowchart showing a non-limiting example of modifications of the transmission process of a search request signal.

In the transmission process of a search request signal of the above embodiment, one channel (2Ch) is used as the search channel for the game apparatus X shown in FIG. 2, and the other game apparatuses A to I that use 2Ch are searched for. However, in a communication system including the game apparatuses 10, the channel used by each game apparatus 10 is selected from a plurality of predetermined channels in accordance with the ambient communication condition of the game apparatus 10. Therefore, the other game apparatuses 10 around the game apparatus X do not necessarily use the same channel as in the game apparatuses A to I, but may use different channels. In such a case, the game apparatus X may use a plurality of search channels to search for other game apparatuses 10 around the game apparatus X, and may search for other game apparatuses 10 that use the respective channels different from each other. FIG. 14 is a flowchart showing a non-limiting example of a transmission process of a search request signal in the case where the game apparatus X uses a plurality of search channels. In FIG. 14, the same steps as those in the transmission process of a search request signal shown in FIG. 8 are denoted by the same reference numerals, and the description thereof will be omitted.

As shown in FIG. 14, in step S62, the processor 11 of the game apparatus X switches the use channel to the first channel (2Ch) of a plurality of search channels (for example, 2Ch and 3Ch ). Then, the process proceeds to step S13 to transmit a search request signal including information about the communication channel (1Ch) by using the channel (2Ch) switched in step S62.

In step S64, the processor 11 of the game apparatus X determines whether or not the search period, which is set for each search channel, has ended. It is noted that the search periods may be respectively set in advance in accordance with search channels to be used, or the same search period may be set for the search channels. The game apparatus X determines whether or not the search period has ended, based on information about the search period corresponding to the search channel (2Ch) that is currently used, and information about the current time. If the result of the determination is YES, the process proceeds to step S65. If the result of the determination is NO, the process returns to step S64 to repeat processing of step S64 until the search period has ended.

In step S65, the processor 11 of the game apparatus X determines whether or not the use channel has been switched to all of the plurality of search channels. If the result of the determination is YES, the process proceeds to step S15. If the result of the determination is NO, the process proceeds to step S66.

In step S66, the processor 11 of the game apparatus X switches the use channel to the next search channel (for example, 3Ch ). Then, the process proceeds to step S13 to transmit a search request signal that includes the communication channel (1Ch) by using the channel (3Ch ) switched in step S66.

It is noted that the order of selection of the search channels for selecting the first search channel (step S62) and the next search channel (step S66) may be defined in advance based on a predetermined rule.

As described above, in the transmission process of a search request signal shown in FIG. 14, even if a plurality of game apparatuses 10 that use different channels (for example, 2Ch and 3Ch ) are present around the game apparatus X, the game apparatus X transmits a search request signal by using each of the different channels (step S62, step S13, and step S66 in FIG. 14). Therefore, each of the game apparatuses 10 can receive the search request signal which includes the communication channel (1Ch) by using the corresponding channel, and transmit the corresponding search response signal. In this way, the game apparatus X can search for other game apparatuses 10, present around the game apparatus X, that use various channels.

In the third modification, the process (the steps shown in FIG. 14) of sequentially switching the use channel to each of the search channels and transmitting search request signals is executed with a predetermined period. However, the process (the steps shown in FIG. 8) of switching the use channel to one search channel and transmit a search request signal may be executed with a predetermined period, and the one search channel used in the process may be sequentially selected from the above search channels in each execution with the predetermined period.

(Other Modifications)

In the above embodiment, the game apparatus X searches for another game apparatus 10 that uses a channel different from the communication channel of the game apparatus X. However, in the case where the game apparatus X searches for another game apparatus 10 that uses the same channel as the communication channel of the game apparatus X, the game apparatus X, needless to say, can search another game apparatus 10 by transmitting a search request signal without switching the use channel.

In addition, in the above embodiment, the game apparatus 10 is used as an example of communication apparatuses, and the game apparatus X executes a communication game with another game apparatus Y by using a communication channel. However, communication applications that the communication apparatus execute with another communication apparatus by using a communication channel are not limited to a communication game, but may be any applications.

In addition, in the above embodiment, network information is written in the search response frame D1b, that is, a search response signal includes information about a network formed by the game apparatus 10 that transmits the search response signal. However, other than such information, a search response signal may include any information. For example, a search response signal may include unique information such as the number of times the game apparatus 10 has previously communicated with the game apparatus X, and the game apparatus X that has received the information may determine to communicate with the game apparatus 10, based on the information. In addition, such information may be displayed on a display section (not shown) of the game apparatus 10, a user may select another game apparatus 10 based on the information, and the game apparatus 10 may establish communication with the other game apparatus that has been selected.

In addition, in the above embodiment, the priorities of transmission of search response signals from the game apparatuses 10 may be determined in accordance with, for example, whether or not a search response signal from each game apparatus 10 reached the game apparatus X (search communication apparatus) in the previous search period. Specifically, the priority of transmission of the game apparatus 10 that has caused a search response signal to reach the game apparatus X in the previous process may be lowered. For example, when the game apparatus 10 that previously caused a search response signal to reach the game apparatus X has received a search request signal again, the game apparatus 10 may not immediately transmit a search response signal, but may wait for a predetermined period to transmit a search response signal. Alternatively, as the rate (success rate) of the number of search response signals that successfully reached the game apparatus X with respect to a predetermined number of search periods increases, the priority may be lowered.

In addition, in the above embodiment, the transmission process of a search request signal, and the transmission process of a search response signal are executed by the processor 11 of the game apparatus 10 executing the wireless communication program P1. However, a circuit realizing such functions may execute the transmission processes.

In addition, in the communication system of the above embodiment, the game apparatuses 10 have the same configuration. However, a search communication apparatus (the game apparatus X shown in FIG. 2) that transmits a search request, and a search subject communication apparatus (the game apparatuses A to I shown in FIG. 2) that receives the search request may not have the same configuration. Specifically, a search communication apparatus may have at least a configuration to transmit a search request signal, and a search subject communication apparatus may have at least a configuration to receive the search request signal, and to transmit a search response signal which is a response to the search request signal. Such configurations are applicable to, for example, a communication system in which a server as a search communication apparatus transmits a search request signal to terminal communication apparatuses as search subject communication apparatuses, and based on the search result, the server distributes data to the terminal communication apparatuses. Thus, the communication system of the above embodiment is not limited to including only a plurality of the game apparatuses 10, but may include the game apparatus 10 and an apparatus other than the game apparatus 10 (for example, a distribution server, an information processing apparatus, or a radio wave relay apparatus).

In addition, in the above embodiment, the transmission process of a search request signal or the transmission process of a search response signal is executed by one game apparatus 10. However, a part or the whole of each process may be executed by one or more other apparatuses (for example, a centralized control system) that can perform wired or wireless communication.

In addition, the configuration of the game apparatus 10 described in the above embodiment is merely an example. The game apparatus 10 may have a configuration other than the above configuration. The setting values used in the game apparatus 10, values used in the determinations, the order of steps of the processes executed by the game apparatus 10, and the like are merely examples. Another order of steps or other values may be used.

In addition, in the above embodiment, the wireless communication program to be executed by the game apparatus 10 is supplied to the game apparatus 10 via a storage medium such as the storage device 12. However, the wireless communication program may be supplied to the game apparatus 10 via a communication line. It is noted that instead of a non-volatile storage memory, a CD-ROM, a DVD, a similar optical disc storage medium, a flexible disc, a hard disc, an optical magnetic disc, a magnetic tape, or the like may be used as an information storage medium for storing the wireless communication program. In addition, a volatile memory for temporarily storing the wireless communication program may be used as an information storage medium for storing the wireless communication program.

While the exemplary embodiments have been described in detail, the foregoing description is in all aspects illustrative and not restrictive. It will be understood that numerous other modifications and variations can be devised.

What is claimed is:

1. A communication system comprising:
   a search communication apparatus configured to communicate with another communication apparatus over a first channel; and
   a plurality of search subject communication apparatuses;
   the search communication apparatus comprising:
      a switcher configured to switch a channel used for communication between the first channel and a second channel different from the first channel, wherein the switcher is configured to, during communication with the another communication apparatus over the first channel, switch to the second channel for a predetermined period of time and return to the first channel, and
      a search request transmitter configured to, once the switcher switches from the first channel to the second channel for the predetermined period of time, transmit a search request signal over the second channel, the search request signal including information about the first channel; and
   each of the search subject communication apparatuses comprising:
      a search subject receiver configured to receive the search request signal over the second channel; and
      a search subject transmitter configured to transmit, to the search communication apparatus, a search response signal which is a response to the search request signal received by the search subject receiver, the search subject transmitter transmitting the search response signal over the first channel, based on the information about the first channel included in the search request signal; and wherein
   the predetermined period is a search period in which the search request transmitter can transmit the search request signal,
   the search request transmitter transmits information indicating the search period,
   the search subject receiver receives the information indicating the search period transmitted from the search communication apparatus, and
   based on the information indicating the search period, the search subject transmitter transmits the search response signal by using the second channel, in the search period,
   and transmits the search response signal by using the first channel, after the search period has elapsed.

2. The communication system according to claim 1, wherein
   the search communication apparatus further comprises a selector configured to select a channel to be used as the first channel from a plurality of predetermined channels in accordance with the ambient communication condition,
   the first channel is used for communication other than transmission of the search request signal, and
   the second channel is one, of the plurality of predetermined channels, that is other than the first channel.

3. The communication system according to claim 1, wherein
   the switcher switches the channel used for communication to the second channel, at the start of the search period and switches the channel used for communication to the first channel at the end of the search period.

4. The communication system according to claim 1, wherein
   based on the information indicating the search period, the search subject transmitter
   does not transmit the search response signal by using the first channel in the search period.

5. The communication system according to claim 1, wherein
   the information indicating the search period is included in the search request signal.

6. The communication system according to claim 1, wherein
   the search request transmitter transmits a search end notification signal as the information indicating the search period, at the end of the search period.

7. A non-transitory computer-readable storage medium having stored therein a communication program which is executed by computers in a communication system that includes a search communication apparatus and a search subject communication apparatus,
   the communication program, when executed by a computer of the search communication apparatus, causes the computer of the search communication apparatus to:
      communicate with another communication apparatus over a first channel;
      switch a channel used for communication by the search communication apparatus between the first channel and a second channel different from the first channel, wherein during communication with the another communication apparatus over the first channel, switch to the second channel for a predetermined period of time and after the predetermined period of time return to the first channel;
      once the channel used for communication is switched from the first channel to the second channel for the predetermined period of time, transmit a search request signal over the second channel, the search request signal including information about the first channel; and
      once the channel used for communication is switched from the second channel to the first channel after the predetermined period of time, receive a search response signal which is a response to the transmitted search request signal, wherein the search response signal is received from the search subject communication apparatus over the first channel; and the communication program, when executed by a computer of the search subject communication apparatus, causes the computer of the search subject communication apparatus to:
receive the search request signal over the second channel; and
transmit, to the search communication apparatus, the search response signal which is a response to the received search request signal, the search response signal being transmitted over the first channel, based on the information about the first channel included in the search request signal; and wherein
the predetermined period is a search period in which the search request signal can be transmitted,
information indicating the search period is transmitted by the search communication apparatus,
the information indicating the search period and transmitted from the search communication apparatus is received by the search subject communication apparatus, and
based on the information indicating the search period, the search response signal is transmitted by using the second channel, in the search period, and the search response signal is transmitted by using the first channel, after the search period has elapsed.

8. A communication method performed in a communication system that includes a search communication apparatus and a search subject communication apparatus, the communication method comprising:
the search communication apparatus communicating with another communication apparatus over a first channel;
switching a channel used for communication by the search communication apparatus between the first channel and a second channel different from the first channel, wherein during communication with the another communication apparatus over the first channel, switching to the second channel for a predetermined period of time and after the predetermined period of time returning to the first channel;
once the channel used for communication is switched from the first channel to the second channel for the predetermined period of time, the search communication apparatus transmitting a search request signal over the second channel, the search request signal including information about the first channel;
once the channel used for communication by the search communication apparatus is switched from the second channel to the first channel after the predetermined period of time,
receiving a search response signal which is a response to the transmitted search request signal, the search response signal is received from the search subject communication apparatus over the first channel;
the search subject communication apparatus receiving the search request signal over the second channel; and
the search subject communication apparatus transmitting, to the search communication apparatus, a search response signal which is a response to the received search request signal, the search response signal being transmitted over the first channel, based on the information about the first channel included in the search request signal; and wherein
the predetermined period is a search period in which the search request signal can be transmitted,
information indicating the search period is transmitted by the search communication apparatus,
the information indicating the search period and transmitted from the search communication apparatus is received by the search subject communication apparatus, and
based on the information indicating the search period, the search response signal is transmitted by using the second channel, in the search period, and the search response signal is transmitted by using the first channel, after the search period has elapsed.

* * * * *